United States Patent [19]

Nakajima et al.

[11] Patent Number: 4,769,742
[45] Date of Patent: Sep. 6, 1988

[54] ELECTROLYTIC CAPACITOR

[75] Inventors: Kohei Nakajima; Kanji Nakagawa, both of Ichihara; Hiroshi Shimada; Toshio Maruyama, both of Nagai, all of Japan

[73] Assignee: Ube Industries, Ltd., Yamaguchi, Japan

[21] Appl. No.: 32,245

[22] Filed: Mar. 31, 1987

[30] Foreign Application Priority Data

May 20, 1986 [JP] Japan ................................ 61-115748

[51] Int. Cl.⁴ .............................................. H01G 9/00
[52] U.S. Cl. .................................................... 361/433
[58] Field of Search ........................... 361/433; 429/86

[56] References Cited

U.S. PATENT DOCUMENTS

| | | | |
|---|---|---|---|
| 1,969,630 | 8/1934 | Sprague et al. | 361/433 |
| 3,647,557 | 3/1972 | Kegelman | 429/86 |
| 3,852,647 | 12/1974 | Ishii | 361/433 |
| 3,878,440 | 4/1975 | Ando | 361/433 |
| 4,617,611 | 10/1986 | Miura et al. | 361/433 |

Primary Examiner—Donald A. Griffin
Attorney, Agent, or Firm—Finnegan, Henderson, Farabow, Garrett and Dunner

[57] ABSTRACT

An electrolytic capacitor which can be protected from rupture thereof due to an increased pressure of electrolytically generated hydrogen gas therein and can be continuously used over a long period of time, comprises an electrolytic liquid contained in a closed container, at least one pair of an anode foil and a cathode foil immersed in the electrolytic liquid, alternately superimposed on each other, coiled together and spaced apart by at least one insulating spacer to form an electrolytic capacitor, anode and cathode terminals being respectively connected to the anode and cathode foils and extending to the outside of the container, and a semipermeable membrane element arranged in a portion of the container and having at least one semipermeable membrane which exhibits, a hydrogen gas-permeating rate of 3.6 cm³/cm²·1000 hours or more determined at 50° C. under a hydrogen gas partial pressure of 2 kg/cm² and a water vapor-permeating rate of 2000 cm³/cm²·1000 hours or less determined at 50° C. under a water vapor partial pressure of 1 kg/cm² or less, to allow the permeation of hydrogen gas therethrough but not the permeation of the electrolytic liquid.

8 Claims, 1 Drawing Sheet

ELECTROLYTIC CAPACITOR

BACKGROUND OF THE INVENTION (1.) Field of the Invention

The present invention relates to an electrolytic capacitor (electric condenser). More particularly, the present invention relates to an electrolytic capacitor which is capable of discharging hydrogen gas electrolytically generated in the capacitor to prevent an undesirable increase in pressure in the capacitor, and thus has an improved safety and an enhanced durability.

(2.) Description of the Related Art

It is known that a conventional electrolytic capacitor comprises a closed container; an electrolytic liquid; at least one pair of an anode foil and a cathode foil immersed in the electrolytic liquid, alternately superimposed on each other and coiled together, the alternately superimposed anode foil and cathode foil being spaced apart by at least one insulating spacer, to provide an electrolytic capacitor element; and an anode terminal and a cathode terminal respectively connected to the anode foil and the cathode foil and extending to the outside of the container.

Also, it is known that, when the conventional electrolytic capacitor is used at a high temperature of, for example, 85° C. or more under a load, a leak current is generated due to oxide layers formed on the anode foil. This leak current causes the electrolytic liquid to be electrolytically decomposed, and to produce a decomposition gas consisting essentially of hydrogen gas.

The generation of the decomposition gas results in an increase in pressure in the container and, finally, in a rupture of the container due to the increased pressure therein.

In order to eliminate the above-mentioned disadvantages, an attempt has been made to add a hydrogen gas-absorbing agent into the electrolytic liquid or to give the oxide layer on the anode foil an excessive thickness to decrease the generation of the leak current. Also, an attempt has been made to form a portion of the container of a porous ceramic material to allow hydrogen gas generated in the container to permeate therethrough to the outside of the container.

Furthermore, an attempt has been made to provide a weak (thin) point in a sealing top or lid portion of the container so that, when a pressure of the hydrogen gas generated in the container increases to a predetermined level, the container is easily opened or broken at the weak portion thereof and the detrimental influence on the environment around the capacitor due to the rupture of the container is reduced as much as possible.

However, the above-mentioned attempts are not always satisfactory for eliminating the disadvantages of the conventional electrolytic capacitor, since they sometimes generate other disadvantages.

SUMMARY OF THE INVENTION

An object of the present invention is to provide an electrolytic capacitor which can be used over a long period of time without breakage from or rupture of the container due to an increased pressure of hydrogen gas generated therein.

Another object of the present invention is to provide an electrolytic capacitor which allows hydrogen gas generated therein to permeate to the outside thereof, but substantially prevents the permeation of water vapor generated therein and an electrolytic liquid contained therein.

The above-mentioned objects can be attained by the electrolytic capacitor of the present invention which comprises a closed container; an electrolytic liquid contained in the container; at least one pair of an anode foil and a cathode foil alternately superimposed on each other, spaced apart by at least one insulating spacer, coiled together to form an electrolytic capacitor element, and immersed in the electrolytic liquid; an anode terminal and a cathode terminal respectively connected to the anode foil and the cathode foil and extending to the outside of the container; and a semipermeable membrane element located in a portion of the container and provided with at least one semipermeable membrane through which the inside space of the container is connected to the outside of the container, which membrane has:

(a) a hydrogen gas-permeating rate of 3.6 $cm^3/cm^2 \cdot 1000$ hours or more, determined at a temperature of 50° C. under a hydrogen gas partial pressure of 2 $kg/cm^2$; and, (b) a water vapor-permeating rate of 2,000 $cm^3/cm^2 \cdot 1000$ hours or less determined at a temperature of 50° C. under a water vapor partial pressure of 1 $kg/cm^2$ or less, and which membrane allows hydrogen gas electrolytically generated from the electrolytic liquid to permeate therethrough to the outside of the container, but does not allow the electrolytic liquid to permeate therethrough.

DESCRIPTION OF THE PREFERRED EMBODIMENTS

Figure 1:
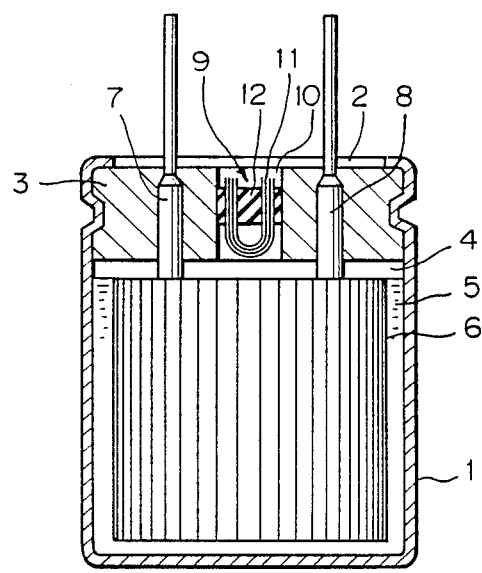
FIG. 1 is a cross-sectional view of an embodiment of the electrolytic capacitor of the present invention.

The electrolytic capacitor of the present invention comprises a closed container; an electrolytic liquid contained in the container; at least one pair of an anode foil and a cathode foil alternately superimposed on each other, spaced apart by at least one spacer, coiled together to provide an electrolytic capacitor element, and immersed in the electrolytic liquid; and an anode terminal and a cathode terminal connected to the anode foil and cathode foil, respectively, and extending to the outside of the container, and a semipermeable membrane element located in a portion, for example, an upper (top) portion, of the container and provided with at least one semipermeable membrane through which the inside space is connected to the outside of the container.

It is important that the semipermeable membrane has:
(a) a hydrogen gas-permeating rate of 3.6 $cm^3/cm^2 \cdot 1000$ hours or more, preferably, 4.0 $cm^3/cm^2 \cdot 1000$ hours or more, more preferably, 10 $cm^3/cm^2 \cdot 1000$ hours or more, determined at a temperature of 50° C. under a partial pressure of hydrogen gas of 2 $kg/cm^2$, and (b) a water vapor-permeating rate of 2,000 $cm^3/cm^2 \cdot 1000$ hours or less, preferably, 1,000 $cm^3/cm^2 \cdot 1000$ hours or less, determined at a temperature of 50° C. under a partial pressure of water vapor of 1 $kg/cm^2$ or less, and thus allows hydrogen gas electrolytically generated in the container to permeate therethrough to the outside of the container but does not allow the electrolytic liquid to permeate therethrough to the outside of the container.

If the hydrogen gas-permeating rate of the semipermeable membrane is less than 3.6 cm$^3$/cm$^2$·1000 hours under the above-mentioned conditions, it is difficult to satisfactorily discharge the hydrogen gas generated in the container to the outside thereof.

If the water vapor-permeating rate of the semipermeable membrane is more than 2,000 cm$^3$/cm$^2$·1000 hours under the above-mentioned conditions, an excess amount of the water is discharged from the container. This phenomenon causes a change in the composition of the electrolytic liquid in the container, and thus results in a degradation in the characteristics of the capacitor.

The semipermeable membrane can be in any form, as long as the purpose of the present invention is attained, but usually, the semipermeable membrane is in the form of a hollow filament or a flat membrane (plain film).

The semipermeable hollow filament preferably has an outside diameter of 200 to 2000 μm and an inside diameter of 100 to 1000 μm.

The semipermeable membrane element preferably contains one or 2 to 20 semipermeable hollow filaments, more preferably one or 2 to 10 semipermeable hollow filaments in the form of a bundle, the outside surfaces of the hollow filaments being exposed only to the inside of the container and the inside surface of the hollow filaments being exposed only to the outside of the container, and the upper end portions of the outside surfaces of the hollow filaments are connected to each other by sealing means so as to prevent exposure of the outside surfaces of the hollow filaments to the outside of the container.

The semipermeable flat membrane preferably has a thickness of 50 to 2000 μm, more preferably 60 to 1000 μm, and one side of the flat membrane is exposed to the inside of the container and the opposite side of the flat membrane is exposed to the outside of the container.

The flat membrane may be reinforced by a perforated plate comprising stainless steel, copper alloy or aluminum alloy, and attached to the outside surface of the flat membrane.

The semipermeable membrane of the present invention comprises at least one member selected from the group consisting of, for example, aromatic and aliphatic polyimides, for example, a polymerization product of benzophenone tetracarboxylic acid with diaminodihyenylether and a polymerization product of diphenyltetnacarboxylic acid with diaminodiphenylether, polypropylene polymers, fluorine-containing polymers, for example, polytetrafluoroethylene, polytrifluoroethylene, trifluoropropylene-tetrafluoroethylene copolymers, silicone polymers, for example, polydimethylsiloxane, aromatic and aliphatic polyamide polymers, for example, a polymerization product of tereplhthalic acid with ethylenediamine, nylon 6, and nylon 66, and polyethylene polymers.

The semipermeable membrane element of the present invention preferably has an entire effective hydrogen gas-permeating area of 0.015 to 70 cm$^2$, more preferably, 0.05 to 15 cm$^2$.

When the semipermeable membrane element contains one or more semipermeable hollow filaments, the entire effective gas-permeating area of the element is considered to be a sum of the effective gas-permeating areas of the hollow filaments, which is calculated in accordance with the equation:

$$\text{Permeating area} = \left(\frac{D_1 + D_2}{2}\right) \times 3.14 \times L$$

wherein $D_1$ represents an outside diameter of the hollow filament, $D_2$ represents an inside diameter of the hollow filament, and L represents a length of the hollow filament.

In the electrolytic capacitor of the present invention, the container has a diameter of from about 4 cm to 24 cm, and a height of from about 5 cm to about 30 cm and is made of, for example, aluminum, an epoxy resin or a polyphenylene oxide resin.

The electrolytic liquid is selected from solutions of an electrolytic material, for example, ammonium adipate or ammonium borate, in water, ethyleneglycol or N,N-dimethyl formamide.

An embodiment of the electrolytic capacitor of the present invention is indicated in FIG. 1.

Referring to FIG. 1, a container 1 has an upper opening 2 which is closed by an upper sealing lid 3 made of a non-electroconductive material, for example, a rubber or plastic resin, and an inside space 4 formed therein. An electrolytic liquid 5 is contained in the inside space 4 of the container 1.

An electrolytic capacitor element 6 is immersed in the electrolytic liquid 5. The electrolytic capacitor element 6 comprises at least one pair of an anode foil and a cathode foil which are formed from an electroconductive metal material, for example, aluminum, or tantalum, are alternately superimposed on each other, are coiled together, and are spaced apart by at least one insulating spacer comprising, for example, kraft paper, Manila paper or a porous organic membrane.

The anode foil and cathode foil are connected to an anode terminal 7 and an cathode terminal 8, respectively, which extend upward from the electrolytic capacitor element 6 to the outside of the container through the sealing lid 3 and the upper opening 2.

In FIG. 1, a semipermeable membrane element 9 is arranged with an opening 10 formed in the sealing lid 3. The semipermeable membrane element 9 comprises a bundle of one or more hollow filaments 11 bent into a U-shape, as shown in FIG. 1, and a sealing plug 12 which seals the opening 10 and through which the top end portions of the U-shaped bundle of hollow filaments 11 extend to the outside of the container 1. That is, the top end portions of the U-shaped bundle of hollow filaments 11 are on the outside of the container 1 and the bottom portions of the U-shaped bundle of hollow filaments 11 are in the inside space of the container 1.

The top end portions of the outside surfaces of the U-shaped bundle of hollow filaments 11 are preferably bonded to each other by a bonding material, for example, an epoxy resin bonding agent.

That is, the lower portions of the outside surfaces of the U-shaped bundle of hollow filaments 11 located below the sealing plug 12 are exposed to the inside atmosphere in the container 1. Also, the hollow spaces in the hollow filaments 11 are connected to the outside atmosphere of the container 1 through the open ends thereof. In other words, the inside hollow surfaces of the hollow filaments 11 are exposed to the outside atmosphere of the container 1.

The semipermeable membrane element is not limited to the element indicated in FIG. 1. For example, the bottom portion of the U-shaped bundle of hollow filaments located in the inside space of the container may be modified into the form of a coil. In another embodiment, one or more straight hollow filaments are extended through the sealing plug so that upper portions and lower portions of the straight hollow filaments are located on the outside and in the inside of the container, respectively. The lower end openings of the straight hollow filaments in the container are blocked so that the hollow inside surfaces of the hollow filaments are not exposed to the inside atmosphere in the container.

When hydrogen gas is generated in the inside space 4 of the container 1, the lower portions of the semipermeable hollow filaments 11 located within the inside space 4 allow the hydrogen gas to permeate from the peripheral surfaces into the hollow inside surfaces of the semipermeable hollow filaments 11 therethrough, and to diffuse from the hollow space of the filament 11 into the outside atmosphere of the container 1.

Accordingly, the pressure of the inside space 4 of the container 1 can be maintained at a desired level and breakage and rupture of the container 1 is prevented.

The electrolytic capacitor of the present invention can be used at any temperature, but usually from room temperature to 150° C.

SPECIFIC EXAMPLES

The present invention will be further explained by way of the following specific examples, which are intended to be representative rather than restrictive of the scope of the present invention.

EXAMPLES 1 to 26

Figure 2:
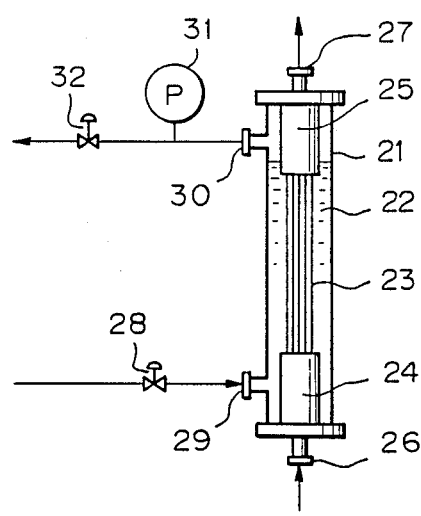
FIG. 2 is a cross-sectional schematic view of a gas-permeation test device.

In each of Examples 1 to 26 the permeating rates of hydrogen gas and water vapor through a semipermeable membrane specimen were determined by using the gaspermeation test device as shown in FIG. 2.

Referring to FIG. 2, a high pressure cylinder 21 was charged with an electrolytic liquid or water 22, and a semipermeable membrane specimen 23 consisting of a plurality of semipermeable hollow filaments was fixed between a lower compartment 24 and upper compartment 25 in such a manner that the hollow spaces of the hollow filaments are connected to the lower and upper compartments 24 and 25. The lower compartment 24 is connected to a supply source (not shown in FIG. 2) through an entrance 26. The upper compartment 25 is connected to the outside atmosphere of the cylinder 21 through an exit 27.

The inside space of the cylinder 21 is connected to a supply source (not shown in FIG. 2) of hydrogen gas through a valve 28 and an entrance 29, and to the outside atmosphere through an exit 30, a pressure meter 31, and a valve 32.

In the measurement procedures, argon gas is supplied at a flow rate of 3 ml/min from the supply source (not shown) thereof into the hollow inside spaces of the hollow filament through the entrance 26 and the lower compartment 24.

Also, hydrogen gas is blown under a pressure of 2 kg/cm$^2$G from a hydrogen gas supply source (not shown) into the electrolytic liquid 22 in the cylinder 21 through the opened valve 28 and the entrance 29, to allow the hydrogen gas to permeate through the hollow filaments into the hollow inside spaces of the hollow filaments. The permeated hydrogen gas was mixed with the argon gas in the hollow inside spaces and the resultant mixed gas was discharged into a gas-chromatographic apparatus (not shown) when the permeating rate of hydrogen gas was to be determined, or into a humidity tester (not shown, Trademark: Du Pont's Humidity tester 303) when the permeating rate of water vapor was to be determined, through the upper compartment 25 and the exit 27.

The high pressure cylinder 21 was provided with a heating jacket (not shown in FIG. 2) and maintained at a predetermined temperature of 15° C. to 100° C.

In each of Examples 1 to 26, the semipermeable membrane specimen was prepared from a plurality of the hollow filaments as shown in Table 1 by bundling the filaments and by bonding the upper and lower ends of the filaments with an epoxy resin bonding agent without blocking the opening of the hollow filaments.

The resultant specimen was subjected to the gaspermeation test under the conditions indicated in Table 1.

The resultant permeating rates of hydrogen gas and water vapor are shown in Table 1.

TABLE 1

| Example No. | Hollow filament | | | | Semipermeable membrane specimen | | |
|---|---|---|---|---|---|---|---|
| | Material | Effective length (cm) | Outside diameter (μm) | Inside diameter (μm) | No. of hollow filaments | Peripheral surface area (cm$^2$) | Effective gas permeating area (cm$^2$) |
| 1 | | | | | | | |
| 2 | | | | | | | |
| 3 | | | | | | | |
| 4 | | | | | | | |
| 5 | Silicone | 7.5 | 381 | 194 | 5 | 4.49 | 3.39 |
| 6 | | | | | | | |
| 7 | | | | | | | |
| 8 | | | | | | | |
| 9 | | | | | | | |
| 10 | | | | | | | |
| 11 | | | | | | | |
| 12 | | | | | | | |
| 13 | | | | | | | |
| 14 | | | | | | | |
| 15 | Polyimide | 9.7 | 502 | 375 | 4 | 6.12 | 5.35 |
| 16 | | | | | | | |
| 17 | | | | | | | |
| 18 | | | | | | | |
| 19 | | | | | | | |
| 20 | | | | | | | |
| 21 | Polyimide | 10.0 | 640 | 402 | 4 | 8.04 | 6.55 |

TABLE 1-continued

| 22 | | | | | | | |
|---|---|---|---|---|---|---|---|
| 23 | Polytetrafluoro-ethylene | 25.5 | 4060 | 1970 | 2 | 65.0 | 48.3 |
| 24 | | | | | | | |
| 25 | Polypropyle | 27.5 | 1030 | 490 | 4 | 35.6 | 36.3 |
| 26 | | | | | | | |

| | | Gas-permeation test | | | Hydrogen | Water |
|---|---|---|---|---|---|---|
| Example No. | Liquid | Temperature (°C.) | $H_2$—gas pressure (kg/cm$^2$G) | Gas-discharge rate (ml/sec) × $10^{-2}$ | gas-permeating rate (cm$^3$/cm$^2$ · 1000 hr) | vapor-permeating rate (cm$^3$/cm$^2$ · 1000 hr) |
| 1 | Electrolytic liquid | 21 | 2.02 | 5.15 | 1245 | 322 |
| 2 | Electrolytic liquid | 50 | 2.00 | 5.29 | 1870 | 730 |
| 3 | Electrolytic liquid | 60 | 1.98 | 5.32 | 1996 | 938 |
| 4 | Electrolytic liquid | 100 | 1.99 | 5.32 | 3580 | 2100 |
| 5 | Electrolytic liquid | 18 | 1.99 | 0.0723 | 584 | * |
| 6 | Electrolytic liquid | 60 | 1.98 | 0.149 | 1195 | * |
| 7 | Electrolytic liquid | 100 | 1.96 | 0.257 | 2061 | * |
| 8 | None | 22 | 2.05 | 5.12 | 2896 | 0 |
| 9 | None | 60 | 2.00 | 5.48 | 7084 | 0 |
| 10 | None | 100 | 2.04 | 5.12 | 11161 | 0 |
| 11 | Electaolytic liquid | 22 | 1.96 | 5.17 | 11.9 | 764 |
| 12 | Electaolytic liquid | 50 | 2.00 | 5.19 | 23.8 | 211.1 |
| 13 | Electaolytic liquid | 60 | 1.99 | 5.18 | 29.0 | 286 |
| 14 | Electaolytic liquid | 100 | 2.00 | 5.32 | 61.6 | 904 |
| 15 | None | 27 | 1.95 | 5.03 | 14.6 | 0 |
| 16 | None | 60 | 1.98 | 4.86 | 34.5 | 0 |
| 17 | None | 100 | 1.98 | 4.89 | 72.7 | 0 |
| 18 | Water | 21 | 1.97 | 5.07 | 10.0 | 84.3 |
| 19 | Water | 60 | 1.96 | 5.15 | 26.2 | 419 |
| 20 | Water | 100 | 1.97 | 5.21 | 52.4 | 700 |
| 21 | Electrolytic liquid | 18 | 1.98 | 5.12 | 5.11 | 34.7 |
| 22 | Water | 18 | 1.97 | 5.09 | 4.71 | 41.5 |
| 23 | Electrolytic liquid | 15 | 1.96 | 5.18 | 9.21 | 2.4 |
| 24 | Electrolytic liquid | 50 | 2.01 | 5.18 | 28.34 | 6.0 |
| 25 | Electrolytic liquid | 16 | 1.98 | 5.16 | ·8.21 | 2.8 |
| 26 | Electrolytic liquid | 50 | 2.00 | 5.16 | 24.09 | 5.1 |

Note:*... Argon gus was not supplied into the hollow inside space of the hollow filament, and therefore, the permeation of water vapor was very small and the determination of the water vapor-permeating rate could not be effected.

EXAMPLES 27 to 31

The semipermeable membrane specimen of Examples 1, 11, 21, 23 and 25 were used in Examples 27, 28, 29, 30 and 31, respectively.

In each of Examples 27 to 31, an electrolytic capacitor of the type shown in FIG. 1 was produced and the semipermeable membrane specimen was used as a U-shaped bundle of hollow filaments 11.

The resultant electrolytic capacitor was operated at a temperature of 85° C. and a current of 200 μA for a long time period of 1000 hours. It was found that all of the tested capacitors operated stably without a decrease in the characteristics of the capacitors, without loss of the electrolytic liquid in the capacitors, and without rupture of the capacitors due to the generation of hydrogen gas and increase in pressure in the capacitors.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. An electrolytic capacitor comprising:
   a closed container;
   an electrolytic liquid contained in the container;
   at least one pair of anode foil and cathode foil alternately superimposed on each other, spaced apart by at least one insulating spacer, coiled together to form an electrolytic capacitor element, and immersed in the electrolytic liquid;
   an anode terminal and a cathode terminal respectively connected to the anode foil and the cathode foil and extending to the outside of the container;

and a semipermeable membrane element for connecting the inside of said container to the outside of said closed container, said semipermeable membrane element including at least one semipermeable membrane
having:
  (a) a hydrogen gas-permeating rate of 3.6 cm$^3$/cm$^2 \cdot$1000 hours or more determined at a temperature of 50° C. under a hydrogen gas partial pressure of 2 kg/cm$^2$, and
  (b) a water vapor-permeating rate of 2,000 cm$^3$/cm$^2 \cdot$1000 hours or less determined at a temperature of 50° C. under a water vapor partial pressure of 1 kg/cm$^2$ or less, for permitting hydrogen gas electrolytically generated from the electrolytic liquid to permeate therethrough to the outside of the container, while restricting the electrolytic liquid from permeating therethrough.

2. The electrolytic capacitor as claimed in claim 1, wherein the semipermeable membrane has a hydrogen gas-permeating rate of 4.0 cm$^3$/cm$^2 \cdot$1000 hours or more at a temperature of 50° C. under a hydrogen gas partial pressure of 2 kg/cm$^2$.

3. The electrolytic capacitor as claimed in claim 1, wherein the semipermeable membrane has a hydrogen gas-permeating rate of 10 cm$^3$/cm$^2 \cdot$1000 hours or more at a temperature of 50° C. under a hydrogen gas partial pressure of 2 kg/cm$^2$.

4. The electrolytic capacitor as claimed in claim 1, wherein the semipermeable membrane is in the form of a hollow filament or a flat membrane.

5. The electrolytic capacitor as claimed in claim 4, wherein the semipermeable hollow filament has an outside diameter of 200 to 2000 μm and an inside diameter of 100 to 1000 μm.

6. The electrolytic capacitor as claimed in claim 4, wherein the semipermeable flat membrane has a thickness of 50 to 2000 μm.

7. The electrolytic capacitor as claimed in claim 1, wherein the semipermeable membrane comprises at least one member selected from the group consisting of aromatic and aliphatic polyimides, polypropylene polymers, fluorine-containing polymers, silicone polymers, aromatic and aliphatic polyamide polymers, and polyethylene polymers.

8. The electrolytic capacitor as claimed in claim 1, wherein the at least one semipermeable membrane in the semipermeable membrane element has an entire effective hydrogen gas-permeating area of 0.015 to 70 cm$^2$.

* * * * *